United States Patent
Aoyama et al.

(10) Patent No.: US 8,628,184 B2
(45) Date of Patent: Jan. 14, 2014

(54) RECORDING METHOD, RECORDING APPARATUS, AND INK SET

(75) Inventors: Tetsuya Aoyama, Shiojiri (JP); Keitaro Nakano, Matsumoto (JP)

(73) Assignee: Seiko Epson Corporation (JP)

( * ) Notice: Subject to any disclaimer, the term of this patent is extended or adjusted under 35 U.S.C. 154(b) by 487 days.

(21) Appl. No.: 13/050,128

(22) Filed: Mar. 17, 2011

(65) Prior Publication Data

US 2011/0234680 A1 Sep. 29, 2011

(30) Foreign Application Priority Data

Mar. 23, 2010 (JP) ................... 2010-066623
Mar. 3, 2011 (JP) ................... 2011-046908

(51) Int. Cl.
*C09D 11/00* (2006.01)

(52) U.S. Cl.
USPC ........................................................ 347/100

(58) Field of Classification Search
USPC ........................................................ 347/100
See application file for complete search history.

(56) References Cited

U.S. PATENT DOCUMENTS

| 4,089,800 | A | 5/1978 | Temple |
| 7,244,021 | B2 | 7/2007 | Arai |
| 2004/0189772 | A1* | 9/2004 | Arai ............................ 347/102 |
| 2005/0237352 | A1 | 10/2005 | Yoneyama |

FOREIGN PATENT DOCUMENTS

| JP | 8-150707 A | 6/1996 |
| JP | 11-129613 A | 5/1999 |
| JP | 11-140365 A | 5/1999 |
| JP | 2001-234093 A | 8/2001 |
| JP | 2004-306591 A | 11/2004 |
| JP | WO2005-105452 A | 11/2005 |
| JP | 2009-221416 A | 10/2009 |

OTHER PUBLICATIONS

JP8-150707A English Patent Abstract and Machine English Translation.
JP11-129613A English Patent Abstract and Machine English Translation.
JP11-140365A English Patent Abstract and Machine English Translation.
JP2001-234093A English Patent Abstract and Machine English Translation.
JP2004-306591A English Patent Abstract (corresponding to US 7,244,021).
JP2009-221416A English Patent Abstract and Machine English Translation.
WO2005-105452A English Patent (corresponding to US2005-237352A).

* cited by examiner

*Primary Examiner* — Laura Martin
(74) *Attorney, Agent, or Firm* — Harness, Dickey & Pierce, P.L.C.

(57) ABSTRACT

[Object]To provide a recording method by which the occurrence of bleeding and repelling in a cured layer can be suppressed during overprinting.
[Solution]In a recording method, a first ink composition containing a colorant, a photopolymerizable compound, and a photopolymerization initiator is ejected from a recording head onto a recording medium; light is emitted from a light source to the first ink composition that has adhered to the recording medium with the result that the first ink composition is cured at a cure rate that is in the range from 70 to 95%; a second ink composition containing a colorant, a photopolymerizable compound, and a photopolymerization initiator is ejected from a recording head to the first ink composition that has been cured on the recording medium; and light is emitted from a light source to the second ink composition.

11 Claims, 1 Drawing Sheet

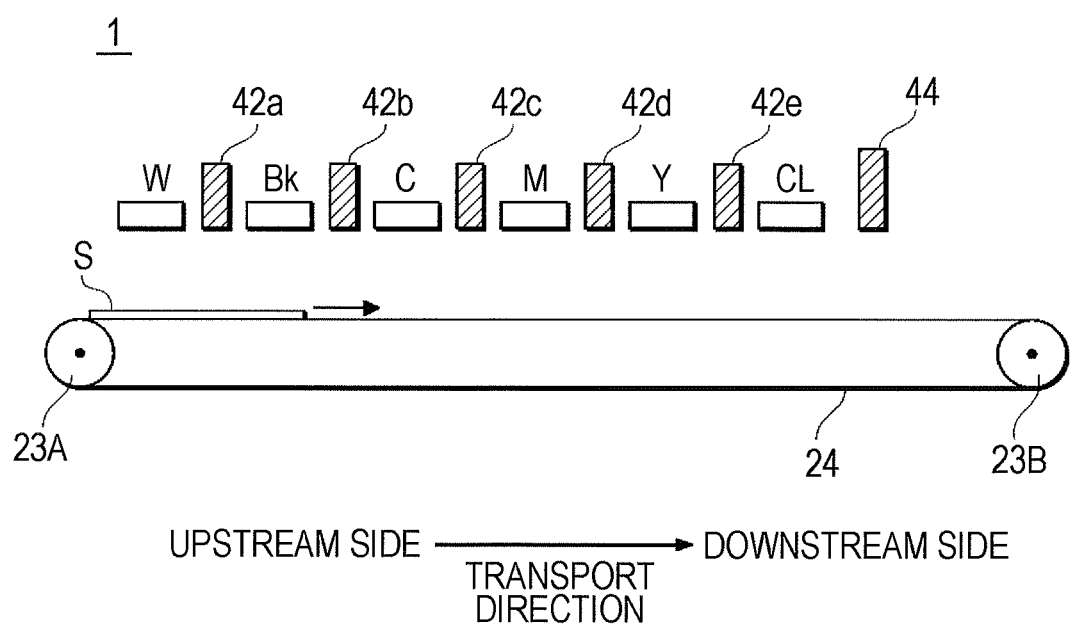

RECORDING METHOD, RECORDING APPARATUS, AND INK SET

CROSS-REFERENCES TO RELATED APPLICATIONS

The entire disclosure of Japanese Patent Applications No. 2010-66623, filed on Mar. 23, 2010, No. 2011-46908, filed on Mar. 3, 2011 are incorporated by reference herein.

TECHNICAL FIELD

The present invention relates to a recording method, a recording apparatus, and an ink set, each being used in overprinting.

BACKGROUND ART

In recent years, in order to form an image having excellent water resistance, solvent resistance, scratch resistance, or the like, a photocurable ink composition has been used. The photocurable ink composition contains a photopolymerizable compound and a photopolymerization initiator. Such an ink composition is applied to a recording medium and is then irradiated with light with the result that the photopolymerizable compound contained in the ink composition is polymerized to solidify ink, thereby forming an image (performing printing). However, in the case where several types of conventional photocurable ink compositions are used to perform multicolor printing (hereinafter referred to as "overprinting", where appropriate), blurring and mixed color (hereinafter referred to as "bleeding") may be caused at a boundary between the individual inks. An image-forming method has been accordingly studied, which enables the occurrence of the bleeding to be prevented and in which multicolor printing is employed.

For example, Patent Literature 1 discloses a technique in which a color ink is applied after a white ink has been completely cured.

In addition, Patent Literature 2 discloses a technique, in which a white ink is used as a background color in surface printing and reverse printing and in which the conversion rate (rate of a polymerization degree, assuming that a polymerization degree of the ink system in an entirely cured state is 100) of the white ink is set to 30% or higher with the result that the bleeding of the white ink and color ink is prevented.

In addition, Patent Literature 3 discloses an ink jet recording method including: a process of ejecting an ink composition A onto a recording medium, the ink composition A containing a (a-1) polymerization initiator and a (b-1) polymerizable compound which contains N-vinylcaprolactam, and the (b-1) polymerizable compound having a monofunctional polymerizable compound in an amount of 65 weight % or larger with respect to the total weight thereof; a process of exposing the ink composition A to activating radiation to cure the ink composition A; a process of ejecting an ink composition B onto at least part of the cured ink composition A, the ink composition B containing a (a-2) polymerization initiator and a (b-2) polymerizable compound, and the (b-2) polymerizable compound having a polyfunctional polymerizable compound in an amount of 50 weight % or larger with respect to the total weight thereof; and a process of exposing the ink composition B to activating radiation to cure the ink composition B.

CITATION LIST

Patent Literature

[PTL 1] JP-A-8-150707
[PTL 2] JP-A-2004-306591
[PTL 3] JP-A-2009-221416

SUMMARY OF INVENTION

Technical Problem

However, in the techniques disclose in Patent Literatures 1 and 2, although the occurrence of the bleeding is prevented during overprinting, ink may be rejected (hereinafter referred to as "repelling") at an interface between layered (overstruck) inks. Therefore, a problem arises, in which the quality stability of an image is reduced. Furthermore, in the techniques disclosed in Patent Literatures 1 and 2, other problems arise, in which the durability of an image is decreased and in which a white ink layer as a ground may be insufficiently cured. In addition, a printed article (record) that is produced by the ink jet recording method disclosed in Patent Literature 3 has a problem of poor adhesion.

It is therefore an object of the invention to provide a recording method which can serve to suppress the occurrence of bleeding and repelling in a cured layer and which provides excellent ink adhesion, during overprinting.

It is another object of the invention to provide a recording apparatus which can serve to suppress the occurrence of bleeding and repelling in a cured layer and which provides excellent ink adhesion, during overprinting.

Solution to Problem

The inventors have studied a cause of the occurrence of bleeding during overprinting. As a result, it has been found that the bleeding is caused for the reason that a layer of an ink (hereinafter referred to as "undercoat layer", where appropriate) which has initially adhered to an adherend mixes with a layer of an ink (hereinafter referred to as "overcoat layer", where appropriate) which has subsequently adhered to the undercoat layer, during overprinting.

Meanwhile, the term "adherend" herein used refers to a recording medium and dots that have been already formed so as to overlie a recording medium as a result of the adhesion of an ink droplet (hereinafter referred to as "ink drop", simply) to the recording medium. In this case, the sentence "dot that have been already formed so as to overlie a recording medium as a result of the adherence of an ink droplet to the recording medium" means, in other words, one or more ink layers that have been already formed so as to overlie the recording medium.

Next, the inventors have studied a cause of the occurrence of repelling during the overprinting. As disclosed in Patent Literature 2, the exposure to radiation is separately performed in two or more processes, and the dots are temporarily cured in a certain degree through the prior exposure (hereinafter referred to as "temporary curing") and is then completely cured through the posterior exposure (hereinafter referred to as "actual curing"), thereby being able to preventing the occurrence of the bleeding. However, the inventors have found the following: if the ink of the undercoat layer is cured to an extent in which the above described mixing is prevented, the curing causes the undercoat layer to be degraded with the result that the repelling of the ink of the overcoat layer is caused.

Next, the inventors have studied causes for the poor durability of an image and the insufficient curing of the ink layer as the undercoat layer (ground). As a result, it has been found that the poor durability of an image is caused resulting from the decrease of scratch resistance and that such a problem is caused for the reason that insufficient adhesion may be generated between the individual cured layers of layered inks. The inventors have found the following: the ink layer as the ground is insufficiently cured for the reasons that the repelling causes a contact area between the inks to be decreased and that light transmittance is reduced in the actual curing that is performed in the final process of the overprinting; and these problems are caused, as in the case of the above problem, for the reason that insufficient adhesion may be generated. In other words, it has been found that stable enhancement of the adhesion between the individual cured layers of layered inks can serve to provide the excellent durability of an image and sufficiently cure the ink layer as the ground.

Relationship between the adhesion and the curability of the ink layer will be more specifically described. On a surface of a film having a high cure degree (cure rate that is larger than 95% and 100% or smaller), the wet and spread properties of ink are insufficient, and a contact area between the ink and the undercoat layer is decreased. The decrease of adhesive force, namely adhesion, may be therefore caused. Furthermore, in the case where a cure degree is decreased (cure rate less than or equal to 95%), the wet and spread properties of the ink are improved, and the affinity of ink components is likely to be increased at an interface between the undercoat layer and the overcoat layer. The adhesive force is therefore increased with the result that the adhesion may be improved. However, in the case where a cure degree is excessively decreased (cure rate less than 70%), the bleeding may become worse.

On the basis of these findings, the inventors have further studied to overcome the above problems. The inventors have finally found that the above problems are overcome through curing a first ink at a cure rate within a predetermined range to form a layer and then overlaying the layer with a subsequent ink, namely a second ink. Then, the study of the invention has been completed.

Specifically, embodiments of the invention are provided as follows.

[1]

A recording method including: a first process which includes ejecting a first ink composition from a recording head onto a recording medium and which includes emitting light from a light source to the first ink composition that has adhered to the recording medium with the result that the first ink composition is cured at a cure rate that is in the range from 70 to 95%, the first ink composition containing a colorant, a photopolymerizable compound, and a photopolymerization initiator; and a second process which includes ejecting a second ink composition from a recording head to the first ink composition that has been cured on the recording medium and which includes emitting light from a light source to the second ink composition that has adhered to the cured first ink composition with the result that the ink composition is cured, the second ink composition containing a colorant, a photopolymerizable compound, and a photopolymerization initiator.

[2]

In the recording method of the section [1], the colorant contained in the first ink composition is a white-based colorant.

[3]

In the recording method of the section [2], the white-based colorant is an inorganic pigment, and the white-based colorant is contained in an amount that is in the range from 8 to 16 weight % with respect to the total weight of the first ink composition.

[4]

In the recording method of any of the sections [1] to [3], each of the first ink composition and the second ink composition has a viscosity of 40 mPa·s or smaller at a temperature of 25° C.

[5]

In the recording method of any of the sections [1] to [4], the first ink composition and the second composition differ from each other in composition.

[6]

In the recording method of any of the sections [1] to [5], the first ink composition and the second ink composition contain N-vinylcaprolactam.

[7]

In the recording method of any of the sections [1] to [6], the first ink composition and the second ink composition each independently contain N-vinylcaprolactam in an amount that is in the range from 10 to 40 weight % with respect to the total weight of the ink composition.

[8]

In the recording method of any of the sections [1] to [7], the first ink composition contains an acylphosphine oxide-based polymerization initiator in an amount larger than or equal to 8 weight % with respect to the total weight of the first ink composition.

[9]

In the recording method of any of the sections [1] to [8], the first ink composition contains 2,4,6-trimethylbenzoyl-diphenyl-phosphine oxide in an amount larger than or equal to 8 weight % with respect to the total weight of the first ink composition.

[10]

A recording apparatus including: a first ejecting section that ejects a first ink composition from a recording head onto a recording medium, the first ink composition containing a colorant, photopolymerizable compound, and a photopolymerization initiator; a first light emitter that emits light from a light source to the first ink composition with the result that the first ink composition is cured at a cure rate that is in the range from 70 to 95%, the first ink composition having adhered onto the recording medium; a second ejecting section that ejects a second ink composition from a recording head to the first ink composition that has been cured on the recording medium, the second ink composition containing a colorant, photopolymerizable compound, and a photopolymerization initiator; and a second light emitter that emits light from a light source to the second ink composition with the result that the second ink composition is cured, the second ink composition having adhered to the cured first ink composition.

[11]

An ink set at least containing the first ink composition and second ink composition that are used in the recording method of any of the sections [1] to [9].

BRIEF DESCRIPTION OF DRAWINGS

FIG. 1 schematically illustrates the vicinity of a recording region in an embodiment of a line printer.

DESCRIPTION OF EMBODIMENTS

Embodiments of the invention will be hereinafter described in detail.

[Recording Method]

An embodiment of the invention relates to a recording method including: a first process of ejecting a first ink composition from a recording head onto a recording medium with the result that the first ink composition adherers to the recording medium and then emitting light from a light source to the first ink composition such that a cure rate of the first ink composition falls within the range from 70 to 95% with the result that the first ink composition is cured, the first ink composition containing a colorant, a photopolymerizable compound, and a photopolymerization initiator; and a second process of ejecting a second ink composition from a recording head to the cured first ink composition with the result that the second ink composition adheres to the first ink composition and then emitting light from a light source to the second ink composition with the result that the second ink composition is cured, the second ink composition containing a colorant, a photopolymerizable compound, and a photopolymerization initiator.

This recording method may further include third, fourth, and fifth processes as hereinafter described with reference to FIG. 1. In the third process, a third ink composition containing a colorant, a photopolymerizable compound, and a photopolymerization initiator is ejected from a recording head to the cured second ink composition and then adheres to the second ink composition, and then light is emitted from a light source to the third ink composition, thereby curing the third ink composition. In the fourth process, a fourth ink composition containing a colorant, a photopolymerizable compound, and a photopolymerization initiator is ejected from the recording head to the cured third ink composition and then adheres to the third ink composition, and then light is emitted from a light source to the fourth ink composition, thereby curing the fourth ink composition. In the fifth process, a fifth ink composition containing a colorant, a photopolymerizable compound, and a photopolymerization initiator is ejected from a recording head to the cured fourth ink composition and then adheres to the fourth ink composition, and then light is emitted from a light source to the fifth ink composition, thereby curing the fifth ink composition. This embodiment will be described in detail through description of a recording apparatus that is used in the recording method.

In this case, temporary curing (pinning) refers to temporarily fixing ink and refers to curing that is performed to prevent the occurrence of bleeding between dots and adjust a dot diameter. Furthermore, the cure rate of ink refers to the conversion rate of the photopolymerizable compound contained in the ink composition.

[Recording Apparatus]

[Configuration of Recording Apparatus]

The recording apparatus of an embodiment of the invention can be used in the recording method. The recording apparatus includes a first ejecting section that ejects a first ink composition from a recording head onto a recording medium, the first ink composition containing a colorant, photopolymerizable compound, and a photopolymerization initiator; a first light emitter that emits light from a light source to the first ink composition with the result that the first ink composition is cured at a cure rate that is in the range from 70 to 95%, the first ink composition having adhered onto the recording medium; a second ejecting section that ejects a second ink composition from a recording head to the first ink composition that has been cured on the recording medium, the second ink composition containing a colorant, photopolymerizable compound, and a photopolymerization initiator; and a second light emitter that emits light from a light source to the second ink composition with the result that the second ink composition is cured, the second ink composition having adhered to the cured first ink composition.

The recording apparatus that is used in this embodiment may be a line printer in which printing is performed while a print head is reciprocated in a direction orthogonally intersecting a direction in which a recording medium is transported or may be a serial printer in which recording is performed such that the print head is not substantially moved. In this case, description will be made while the line printer is employed as an example of the recording apparatus that is used in this embodiment.

FIG. 1 schematically illustrates the vicinity of a recording region in an aspect of a line printer 1 as an example of the recording apparatus of this embodiment.

The printer 1 that is used in this embodiment is an apparatus in which a photocurable ink that is cured through exposure to light is ejected as an example of a liquid ink with the result that an image is formed on a recording medium. The photocurable ink contains a photocurable resin composition containing a photopolymerizable compound, a photopolymerization initiator, and the like and is cured through polymerization caused by exposure to light. The specific composition of the photocurable ink will be hereinafter described. A color pattern (ink type to be used and sequence of using ink) in multicolor printing is not specifically limited, and a clear ink is optionally used, but a color pattern in multicolor printing, for example, illustrated in FIG. 1 may be employed. Specifically, in the printer 1, printing is performed (an image is formed) using: a photocurable white ink (W) as a background color; four colors of photocurable inks, including BkCMY; and a photocurable transparent and colorless ink (clear ink, CL). In this case, the term "BkCMY" means four colors including black (Bk), cyan (C), magenta (M), and yellow (Y).

For example, as illustrated in FIG. 1, the recording region that serves to transport a recording medium in a predetermined direction (hereinafter referred to as "transport direction") has an upstream transport roller 23A, a downstream transport roller 23B, and a belt 24. A transport motor (not illustrated) is rotated, and then the upstream transport roller 23A and the downstream transport roller 23B are rotated, thereby rotating the belt 24. A recording medium S that has fed by a paper feed roller (not illustrated) is transported by the belt 24 to a region in which printing can be performed (a region that faces a recording head). The belt 24 transports the recording medium S, so that the recording medium S is moved in a transport direction with respect to a recording head set (not illustrated). The recording medium S (adherend) that has passed through the region in which printing can be performed is ejected to the outside by the belt 24. In this case, the recording medium S during the transportation electrostatically adheres to or vacuum-contacts to the belt 24. Meanwhile, although the term "paper feed" has been herein used for convenience of the description, a recording medium that will be hereinafter described is used as the recording medium S of this embodiment.

The photocurable ink is ejected from a recording head set to the adherend, the recording head set being provided as an ejecting section corresponding to each of the above first ejecting section and second ejecting section. In this embodiment, a white ink, color ink, and transparent and colorless clear ink that are used to form an image are each ejected as the photocurable ink. Recording heads included in the recording head set individually eject inks of respective colors to the adherend during the transportation, so that dots are formed on the adherend, thereby forming an image on the recording medium. The printer 1 that is used in this embodiment is a line printer, and the individual recording heads of the recording head set can serve to simultaneously form dots in the width of the medium. Specifically, the apparatus illustrated in FIG. 1 has the recording heads including, in sequence from the upstream side in the transport direction, a first recording head W that ejects a photocurable white ink as the first ink composition (hereinafter simply referred to as "first ink", where appropriate and the same will be hereinafter applied), a second recording head Bk that ejects a photocurable black ink as the second ink, a third recording head C that ejects a photocurable cyan ink as a third ink, a fourth recording head M that ejects a photocurable magenta ink as a fourth ink, a fifth recording head Y that ejects a photocurable yellow ink as a fifth ink, and a clear ink recording head CL that ejects a clear ink. The term "recording head" will be hereinafter simply referred to as "head", where appropriate. In this case, each of the heads is provided in the plural number in a direction from the depth in the page of the drawing to the near side (in a direction orthogonal to the transport direction) so as to be able to eject ink corresponding to dots in the width of a medium. Each of the heads is accordingly controlled from the upstream side to form dots at appropriate positions in a line corresponding to the width of the medium, so that an image can be formed only through a single scan of the recording medium in the transport direction.

The transport direction of the recording medium is a scanning direction in which ink is ejected from the heads to the recording medium while the heads and the recording medium are relatively moved. A side (left side in FIG. 1) from which the recording medium is transported so as to approach the heads is the upstream side in the transport direction, and a side (right side in FIG. 1) to which the recording medium is transported so as to depart from the heads is the downstream side in the transport direction. Furthermore, as a modification, the position of the recording medium may be fixed, and scanning may be performed such that ink is ejected from the heads to the recording medium while the heads and light sources are moved with respect to the recording medium. In this case, if the scanning is performed such that the heads and the light sources are moved, for example, to the left side in FIG. 1 with respect to the recording medium, the left side in FIG. 1 is the upstream side of a scanning direction, and the right side in FIG. 1 is the downstream side of the scanning direction.

The light sources emit light to the photocurable ink composition that has adhered to the adherend, the light sources being provided as light emitters corresponding to the first light emitter and the second light emitter. Ink drops that have adhered to the adherend, namely formed dots, are exposed to light from the light emitters, thereby being cured. As illustrated in FIG. 1, the light emitters of this embodiment include temporary curing light emitters (temporary curing light sources) 42a to 42e and an actual curing light emitter 44 (actual curing light source).

The temporary curing light emitters 42a to 42e emit light that functions to temporarily cure dots that have been formed on the adherend. At least part of a surface or the like of the ink composition that is in the form of the dots may be therefore cured.

The first light source 42a, second light source 42b, third light source 42c, fourth light source 42d, and fifth light source 42e (the light sources may be the same or different, and in the case where different light sources are used, types of the light sources may be the same or different), which serve as the temporary curing light emitters, are respectively provided at the downstream sides of the first head W, second head Bk, third head C, fourth head M, and fifth head Y in the transport direction. In other words, the temporary curing light emitter is provided for every ink color.

The temporary curing light emitter 42a that serves to cure the ink of the background color (white ink) preferably includes a Light Emitting Diode (LED) or a lamp (such as a metal halide lamp, xenon lamp, carbon-arc lamp, chemical lamp, low-pressure mercury lamp, or high-pressure mercury lamp) as the light source for emitting light. In the case of using the LED, emission energy can be easily changed as a result of controlling the magnitude of input current.

On the other hand, the temporary curing light emitters 42b to 42e that serve to cure an image-forming ink preferably include the LEDs as the light sources for emitting light.

In this case, a light source that emits ultraviolet light (UV) having a wavelength of 450 nm or shorter is preferably employed as the first light source 42a. In this case, an advantageous effect can be provided, in which a photopolymerization reaction is initiated in ink with the result that predetermined curing can be imparted to the ink. In addition, an amount of light that is emitted from the first light source 42a in the temporary curing, namely light emission energy, is not limited. Varied depending on ink composition, such energy is, for example, 50 mJ/cm$^2$ or larger, and curing energy which enables a cure rate to fall within the range from 70 to 95% is preferably employed.

Preferably, each of the second light source 42b, third light source 42c, fourth light source 42d, and fifth light source 42e is an independent light source that emits ultraviolet light (UV) having a peak wavelength of preferably 450 nm or shorter, more preferably in the range from 300 to 450 nm. In this case, the photopolymerization reaction is initiated in the ink, thereby being able to impart an advantageous effect of the temporary curing to the ink so as to sufficiently suppress the bleeding. Furthermore, the amounts of light beams that are emitted from the second light source 42b, third light source 42c, fourth light source 42d, and fifth light source 42e in the temporary curing, namely light emission energy, are not limited. Varied depending on ink composition, such energy is, for example, 50 mJ/cm$^2$ or smaller, preferably in the range from 3 to 40 mJ/cm$^2$. Furthermore, in each of the second light source 42b, third light source 42c, fourth light source 42d, and fifth light source 42e, the LED is preferably employed as the light source for emitting light, in terms of decreasing the size of the recording apparatus and reducing electric power.

The actual curing light emitter 44 emits light to almost completely cure the dots formed on the adherend. The actual curing light emitter 44 is provided to the downstream side in the transport direction relative to the position of the clear ink head CL. The actual curing light emitter 44 emits light to the dots that have been formed by each of the heads of the head set.

The actual curing light emitter 44 of this embodiment includes an LED or a lamp (such as a metal halide lamp, xenon lamp, carbon-arc lamp, chemical lamp, low-pressure mercury lamp, or high-pressure mercury lamp) as the light source for emitting light. Although the light source for emitting light is not specifically limited, one of a type that can emit light having a wavelength of 450 nm or shorter is preferably employed. An amount of light emitted in the actual curing, namely light emission energy, is not limited. Varied depending on ink composition, such energy is, for example, 100 mJ/cm$^2$ or larger and is approximately 200 to 300 times as large as the light emission energy from the second light source 42b, third light source 42c, fourth light source 42d, and fifth light source 42e in the temporary curing.

[Printing Operation (Recording Method)]

With reference to FIG. 1, the recording medium first passes below the first head W (head that ejects a white ink), and the white ink is ejected from the first head W during such passing, thereby forming dots on the recording medium. Subsequently, the recording medium passes below the temporary curing light emitter 42a, and light is emitted during the passing, thereby temporarily curing the dots formed by the first head W. Also with respect to a black ink using the second head Bk, a cyan ink using the third head C, a magenta ink using the fourth head M, a yellow ink using the fifth head Y, the dot formation and the light emission are performed in a similar manner.

As described above, immediately after the dots have been formed for each color with the white ink and the color inks, light beams are respectively emitted from the temporary curing emitters.

Then, a clear ink is entirely applied using the clear ink head CL, and the dots formed on the adherend are exposed to light emitted from the actual curing emitter 44 and are then actually cured.

In the inventiveness (method) of this embodiment, light is emitted from the first light source 42a such that the first ink composition is cured at a cure rate that is in the range from 70 to 95%. In the case where a layer which has been formed as a result of curing the first ink at a cure rate that falls within a predetermined range is overlaid with a subsequent ink, namely at least any of the second ink, third ink, fourth ink, and fifth ink, the occurrence of the bleeding and repelling is suppressed in the cured layer during the overprinting. The excellent durability of an image is accordingly provided, and a white ink layer as a first ink layer which serves as a ground can be sufficiently cured. In particular, the first ink is cured at a cure rate that is in the range from 70 to 95%, so that excellent print quality can be provided so as to be free from the occurrence of the bleeding and repelling even in the case where the first ink layer serves as the white ink layer. In contrast, in the case where the layer that has been formed as a result of curing the first ink at a cure rate exceeding 95% is overlaid with a subsequent ink, namely at least any of the second ink, third ink, fourth ink, and fifth ink, the repelling occurs to cause a defect in a color image. Furthermore, in the case where the layer that has been formed as a result of curing the first ink at a cure rate less than 70% is overlaid with a subsequent ink, namely at least any of the second ink, third ink, fourth ink, and fifth ink, the bleeding occurs to cause a defect in the color image.

The first ink composition is cured through exposure to light from the first light source 42a at a cure rate that is preferably in the range from 70 to 90%, more preferably in the range from 75 to 90%.

In FIG. 1, the first ink is used as the ink of the background color (white ink). In this case, a modification can be employed, in which the first ink is used as an image-forming ink (color ink) in place of the ink of the background color (white ink). Description will be therefore separately made with respect to individual cases in which the first ink is used as the ink of the background color and in which the first ink is used as the image-forming ink. Conditions of the temporary curing lie as the most important difference between the case in which the first ink is used as the ink of the background color and the case in which the first ink is used as the image-forming ink. In the case of using the first ink as the ink of the background color, temporary curing energy (for example, 50 mJ/cm$^2$ or larger) that enables a cure rate to fall within a range from 70 to 95% is preferably employed.

On the other hand, in the case of using the first ink as the image-forming ink, the temporary curing energy is preferably at a level sufficient for suppressing the occurrence of the bleeding (for example, 50 mJ/cm$^2$ or smaller). In this case, actual curing energy is preferably at a level of, for example, 100 mJ/cm$^2$ or larger.

Difference between the ink of the background color and the image-forming ink in the conditions of the temporary curing is further described. In this embodiment, the ink ejected from the first head is uniformly applied to an appropriate range on the recording medium and can serve as the background color of an image. In this case, by virtue of using the white ink as the ink of the background color, the quality of a printed image that is produced using a color ink can be further enhanced, a high-quality image can be also formed on a transparent or semitransparent recording medium such as a soft packaging film, and a desired image quality can be provided regardless of the color of the recording medium.

In the case of the recording in which the background color is provided, the total amount of the ink supplied per unit area is further increased by the amount of the ink of the background color as compared with printing in which the background color is not provided, and the fear of the occurrence of the bleeding and the fear of the decreased durability of the image are therefore increased. Furthermore, an ink property at an overcoated side, namely the optical absorption property of a colorant, is deteriorated, a film thickness serves to decrease light transmittance, and the fear of the occurrence of the bleeding and the fear of the decreased durability of the image may be further increased at an interface in some cases. In the case of the recording in which the background color is provided, an optimum method of curing the ink of the background color is therefore required.

A method of measuring the cure rate in this embodiment will be described. As described above, the cure rate of ink refers to the conversion rate of the photopolymerizable compound contained in the ink composition. In addition, the cure rate of the ink also can refer to progress of the curing of the photopolymerizable resin, such progress providing an indication of a temporarily cured state. As an apparatus of measuring the conversion rate in this embodiment, an infrared spectrophotometer which enables real-time measurement [NEXUS470 (product name) commercially available from Thermo Nicolet Corp.] is employed.

In this embodiment, the cure rate of the first ink composition means the conversion rate of the photopolymerizable compound from before the first light source 42a emits light to the first ink composition until just before the second ink composition is ejected after light has been emitted, the photopolymerizable compound being contained in the first ink composition.

In particular, in the line printer 1, an image is formed merely through once scanning the recording medium in the transport direction as described above, and dots of different colors therefore have a high possibility of being positioned adjacent to each other as compared with a serial printer or the like. The bleeding is accordingly easily caused, and it becomes more important to prevent the bleeding. However, the recording apparatus that is used in this embodiment is not limited to the line printer as described above, and a serial printer may be employed. Specific examples of the serial printer include one of a type that is illustrated in FIGS. 3 to 5 in the disclosure in International Publication No. WO 2005-105452.

Also in such a line printer 1, the first ink composition is temporarily cured at a cure rate that falls within a predetermined range as described above, thereby being able to decrease the bleeding and being able to improve printing properties.

In the recording method, as is obvious from the above description, an ink jet recording technique is preferably employed. In other words, in the case where the above photocurable ink composition is used to form an image on a recording medium, the ink jet recording technique is preferably used. Each of the traditionally known techniques can be employed as the ink jet recording technique. In particular, a technique in which an ink drop is ejected by utilizing the vibration of a piezoelectric device (recording method in which an ink jet head is utilized, the ink jet head serving to form an ink drop owing to the mechanical deformation of an electrostrictive device) is employed, thereby being able to perform excellent image recording.

[Ink Composition]

The ink compositions that are used in the recording method and recording apparatus of the above embodiment (hereinafter simply referred to as "this embodiment", where appropriate), namely the first ink, second ink, third ink, fourth ink, and fifth ink, at least individually contain the photopolymerizable compounds (the photopolymerizable compound contained in the first ink, the photopolymerizable compound contained in the second ink, the photopolymerizable compound contained in the third ink, the photopolymerizable compound contained in the fourth ink, and the photopolymerizable compound contained in the fifth ink), the photopolymerization initiators (the photopolymerization initiator contained in the first ink, the photopolymerization initiator contained in the second ink, the photopolymerization initiator contained in the third ink, the photopolymerization initiator contained in the fourth ink, and the photopolymerization initiator contained in the fifth ink), and the colorants (the colorant contained in the first ink, the colorant contained in the second ink, the colorant contained in the third ink, the colorant contained in the fourth ink, and the colorant contained in the fifth ink). The clear ink at least contains a photopolymerizable compound and a photopolymerization initiator.

In this case, the first ink and the second ink have a difference in a function such as an ink color and are therefore preferably provided as ink compositions different from each other in composition. Meanwhile, the term "ink compositions different from each other in composition" refers to ink compositions which have a difference in at least any of types and amounts of contained components. Similarly, as in the case of the first ink and the second ink, also in the third ink, fourth ink, and fifth ink, it is preferable that at least two inks among the first to fifth inks are ink compositions different from each other in composition, and it is more preferable that all of the inks are ink compositions different from one another in composition.

Description will be hereinafter made on the basis that the first ink, second ink, third ink, fourth ink, and fifth ink are not limited to the above white, black, cyan, magenta, and yellow inks, respectively.

(1. Photopolymerizable Compound)

The photopolymerizable compound that is used for the ink composition of this embodiment is not specifically limited as long as the photopolymerizable compound is provided as a compound which is polymerized by the action of the hereinafter described photopolymerization initiator during emission of light such as ultraviolet light (UV) with the result that the compound is cured. Various types of monomers and oligomers each having a monofunctional group, difunctional group, and a polyfunctional group such as a trifunctional or higher group can be employed.

Examples of the monomers include unsaturated carboxylic acids, such as (meth)acrylic acid, itaconic acid, crotonic acid, isocrotonic acid, and maleic acid, and salts or esters thereof; urethane, amide, and anhydride thereof; acrylonitrile; styrene; various unsaturated polyesters; unsaturated polyether; unsaturated polyamide; and unsaturated urethane. Examples of the oligomers include oligomers formed by the above monomers, such as straight-chain acrylic oligomer; epoxy (meth)acrylate; aliphatic urethane(meth)acrylate; aromatic urethane(meth)acrylate; and polyester(meth)acrylate.

Furthermore, N-vinyl compounds may be contained as other monofunctional monomers and polyfunctional monomers. Examples of the N-vinyl compounds include N-vinylformamide, N-vinylcarbazole, N-vinylacetamide, N-vinylpyrrolidone, N-vinylcaprolactam, acryloylmorpholine, and derivatives thereof. Among these, in terms of further enhancing adhesion to the recording medium, the first ink and the second ink (in addition, the third ink, fourth ink, and fifth ink) preferably contain N-vinylcaprolactam.

Among the above examples, (meth)acrylic acid ester, namely (meth)acrylate, is preferably employed.

The term "(meth)acrylate" herein refers to acrylate and methacrylate corresponding thereto, and the term "(meth)acryl" herein refers to acryl and methacryl corresponding thereto.

Examples of monofunctional (meth)acrylate of the above (meth)acrylate include isoamyl(meth)acrylate, stearyl(meth)acrylate, lauryl(meth)acrylate, octyl(meth)acrylate, decyl(meth)acrylate, isomyristyl(meth)acrylate, isostearyl(meth)acrylate, 2-ethylhexyl-diglycol(meth)acrylate, 2-hydroxybutyl(meth)acrylate, butoxyethyl(meth)acrylate, ethoxydiethylene glycol(meth)acrylate, methoxydiethylene glycol(meth)acrylate, methoxypolyethylene glycol(meth)acrylate, methoxypropylene glycol(meth)acrylate, phenoxyethyl(meth)acrylate, tetrahydrofurfuryl(meth)acrylate, isobornyl(meth)acrylate, 2-hydroxyethyl(meth)acrylate, 2-hydroxypropyl(meth)acrylate, 2-hydroxy-3-phenoxypropyl(meth)acrylate, lactone-modified flexible (meth)acrylate, t-butylcyclohexyl(meth)acrylate, dicyclopentanyl(meth)acrylate, dicyclopentenyloxyethyl(meth)acrylate, and isobornyl(meth)acrylate.

Examples of difunctional (meth)acrylate of the above (meth)acrylate include triethylene glycol di(meth)acrylate, tetraethylene glycol di(meth)acrylate, polyethylene glycol di(meth)acrylate, tripropylene glycol di(meth)acrylate, polypropylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, dimethylol-tricyclodecane di(meth)acrylate, ethylene oxide (EO)-added bisphenol A di(meth)acrylate, propylene oxide (PO)-added bisphenol A di(meth)acrylate, hydroxypivalic acid neopentyl glycol di(meth)acrylate, and polytetramethylene glycol di(meth)acrylate.

Examples of trifunctional or higher-functional (meth)acrylate of the above (meth)acrylate include trimethylolpropane tri(meth)acrylate, EO-modified trimethylolpropane tri(meth)acrylate, pentaerythritol tri(meth)acrylate, pentaerythritol tetra(meth)acrylate, dipentaerythritol hexa(meth)acrylate, ditrimethylolpropane tetra(meth)acrylate, glycerinpropoxy tri(meth)acrylate, cauprolactone-modified trimethylolpropane tri(meth)acrylate, pentaerythritolethoxy tetra(meth)acrylate, and caprolactam-modified dipentaerythritol hexa(meth)acrylate.

Among these, because ejection stability can be easily provided in ink jet recording owing to high flexibility of an ink layer during the curing and low viscosity, the monofunctional (meth)acrylate can be preferably contained as the photopolymerizable compound. In addition, in terms of increasing the hardness of the ink layer, the monofunctional (meth)acrylate and the difunctional (meth)acrylate are more preferably used in combination. The above photopolymerizable compounds may be used alone or in combination of two or more.

Furthermore, the monofunctional (meth)acrylate preferably has one or more skeletons selected from the group consisting of an aromatic ring skeleton, saturated alicyclic skeleton, and unsaturated alicyclic skeleton. The monofunctional (meth)acrylate having such skeletons is employed as the photopolymerizable compound, so that the viscosity of the ink composition is decreased and so that the epoxy group-containing polymer can be effectively dissolved in the ink composition.

Examples of the monofunctional (meth)acrylate having the aromatic ring skeleton include phenoxyethyl(meth)acrylate and 2-hydroxy-3-phenoxypropyl(meth)acrylate. Examples of the monofunctional (meth)acrylate having the saturated alicyclic skeleton include isobornyl(meth)acrylate, t-butylcyclohexyl(meth)acrylate, and dicyclopentanyl(meth)acrylate. Examples of the monofunctional (meth)acrylate having the unsaturated alicyclic skeleton include dicyclopentenyloxyethyl(meth)acrylate.

In order to increase the hardness of a film during the curing, decrease ink viscosity, and enable excellent ejection stability to be provided in ink jet recording, the photopolymerizable compound is contained in an amount that is preferably in the range from 30 to 90 weight % with respect to the total weight of the ink (100 weight %), more preferably in the range from 40 to 85 weight %. Especially in the case where the first ink and the second ink (in addition, the third ink, fourth ink, and fifth ink) contain N-vinylcaprolactam as described above, the N-vinylcaprolactam is independently contained in each of the inks in an amount that is preferably in the range from 10 to 40 weight % with respect to the total weight of the ink, more preferably in the range from 15 to 30 weight %, thereby further enhancing adhesion to the recording medium. Meanwhile, the N-vinylcaprolactam may be contained in each of the first ink and the second ink (in addition, the third ink, fourth ink, and fifth ink) in the same or different amounts.

(2. Photopolymerization Initiator)

The polymerization initiator contained in the ink composition of this embodiment is not specifically limited as long as the polymerization initiator generates active species, such as a radical and a cation, with the energy of light such as ultraviolet light (UV) to initiate polymerization of the photopolymerizable compound. A radical polymerization initiator or a cationic polymerization initiator can be employed, and the radical polymerization initiator is preferably employed in particular.

Examples of the radical polymerization initiator include aromatic ketones, acylphosphine compounds, aromatic onium salt compounds, organic peroxide, thio compounds, hexaarylbiimidazole compounds, ketoxime ester compounds, borate compounds, azinium compounds, metallocene compounds, active ester compounds, compounds having a carbon-halogen bond, and alkylamine compounds.

Specific examples of the radical polymerization initiator include acetophenone, acetophenone benzyl ketal, 1-hydroxycyclohexyl phenyl ketone, 2,2-dimethoxy-2-phenylacetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzyl dimethyl ketal, 1-(4-isopropylphenyl)-2-hydroxy-2-methylpropane-1-one, 2-hydroxy-2-methyl-1-phenylpropane-1-one, thioxanthone, diethylthioxanthone, 2-isopropylthioxanthone, 2-chlorothioxanthone, 2-methyl-1-[4-(methylthio)phenyl]-2-morpholino-propane-1-one, bis(2,4,6-trimethylbenzoyl)-phenylphosphine oxide, 2,4,6-trimethylbenzoyl-diphenyl-phosphine oxide, 2,4-diethylthioxanthone, and bis-(2,6-dimethoxybenzoyl)-2,4,4-trimethylpentylphosphine oxide.

Examples of a commercially available product of the radical polymerization initiator include IRGACURE 651 (2,2-dimethoxy-1,2-diphenylethane-1-one), IRGACURE 184 (1-hydroxy-cyclohexyl-phenyl-ketone), DAROCUR 1173 (2-hydroxy-2-methyl-1-phenyl-propane-1-one), IRGACURE 2959 (1-[4-(2-hydroxyethoxy)-phenyl]-2-hydroxy-2-methyl-1-propane-1-one), IRGACURE 127 (2-hydroxy-1-{4-[4-(2-hydroxy-2-methyl-propionyl)-benzyl]phenyl}-2-methyl-propane-1-one), IRGACURE 907 (2-methyl-1-(4-methylthiophenyl)-2-morpholinopropane-1-one), IRGACURE 369 (2-benzyl-2-dimethylamino-1-(4-morpholinophenyl)-butanone-1), IRGACURE 379 (2-(dimethylamino)-2-[(4-methylphenyl)methyl]-1-[4-(4-morpholinyl) phenyl]-1-butanone), DAROCUR TPO (2,4,6-trimethylbenzoyl-diphenyl-phosphine oxide), IRGACURE 819 (bis(2,4,6-trimethylbenzoyl)-phenylphosphine oxide), IRGACURE 784 (bis(η5-2,4-cyclopentadiene-1-yl)-bis(2,6-difluoro-3-(1H-pyrrole-1-yl)-phenyl)titanium), IRGACURE OXE 01 (1.2-octanedione,1-[4-(phenylthio)-,2-(O-benzoyloxime)]), IRGACURE OXE 02 (ethanone,1-[9-ethyl-6-(2-methylbenzoyl)-9H-carbazole-3-yl]-,1-(O-acetyloxime)), IRGACURE 754 (mixture of oxy phenyl acetic acid, oxyphenyl-acetic acid 2-[2-oxo-2-phenyl acetoxy ethoxy]ethyl ester, and 2-(2-hydroxyethoxy)ethyl ester) (each being the name of a product from BASF Corporation); DETX-S (2,4-diethylthioxanthone) (the name of a product from Nippon Kayaku Co., Ltd.); Lucirin TP0, LR8893, and LR8970 (each being the name of a product from BASF Corporation); and Uvecryl P36 (name of a product from UCB Corporation).

Among these, acylphosphine oxide-based polymerization initiators such as DAROCUR TPO and IRGACURE 819 can serve to further enhance curability and are therefore preferably employed.

The acylphosphine oxide-based polymerization initiators have advantages such as reduced odor, excellent compatibility to a solvent, and being able to further suppress coloration after the reaction. Among the acylphosphine oxide-based polymerization initiators, DAROCUR TPO (2,4,6-trimethyl-benzoyl-diphenyl-phosphine oxide) is more preferably employed for the reason that each of the advantages is further enhanced and that the occurrence of yellowing is further suppressed as compared with other polymerization initiators such as a thioxanthone-based initiator.

The above photopolymerization initiators may be used alone or in combination of two or more.

In order to further enhance solubility to the ink and polymerization reactivity, such a photopolymerization initiator is contained in an amount that is preferably in the range from 3 to 15 weight % with respect to the total weight of the ink, more preferably in the range from 3.5 to 12 weight %. Especially in the case where the first ink (furthermore the second ink, and moreover the third ink, fourth ink, and fifth ink) contains the acylphosphine oxide-based polymerization initiator, odor is further reduced, excellent curability and compatibility to a solvent are provided, and coloration after the reaction is further suppressed. The acylphosphine oxide-based polymerization initiator is therefore contained preferably in an amount of 8 weight % or larger, more preferably in an amount that is in the range from 8 to 12 weight %.

In the case where the first ink (furthermore the second ink, and moreover the third ink, fourth ink, and fifth ink) contains 2,4,6-trimethylbenzoyl-diphenyl-phosphine oxide among the acylphosphine oxide-based polymerization initiators, odor is further reduced, excellent curability and compatibility to a solvent are further provided, coloration after the reaction is further suppressed, and the occurrence of yellowing is further suppressed. The 2,4,6-trimethylbenzoyl-diphenyl-phosphine oxide is therefore contained preferably in an amount of 8 weight % or larger with respect to the total weight of the ink (100 weight), more preferably in an amount that is in the range from 8 to 12 weight %.

(3. Colorant)

The ink composition of this embodiment may further contain a colorant.

This embodiment includes a white ink and color inks (for example, four colors including a yellow ink, magenta ink, cyan ink, and black ink) and preferably includes a light magenta ink and light cyan ink to produce a photograph-like image. In addition, an orange ink and a green ink are included, thereby being able to produce an image in which a print target is accurately reproduced.

The first ink composition that is ejected and directly adheres to the recording medium and that is then cured is generally used for a background color. Such a first ink composition that serves as the background color may be a color ink or a white ink. In the case where the first ink composition is the color ink, a color ink having another color, a white ink, or a clear ink may be employed as the second ink composition with which a first ink composition layer formed on the recording medium is overlaid. In the case where at least any of the third ink composition, fourth ink composition, and fifth ink composition that are applied after the use of the second ink composition is a white ink, the ink composition may not be subsequently used, or a clear ink may be employed as the ink composition to be subsequently used. In the case where any of the second, third, fourth, and fifth ink compositions is a clear ink, the ink composition are not subsequently used in general. In contrast, in the case where the first ink composition is a white ink, a color ink or clear ink may be employed as the second ink composition with which the first ink composition layer formed on the recording medium is overlaid. In the case where the second, third, fourth, and fifth ink compositions are each a color ink and in the case where the ink composition is subsequently further used, the ink composition subsequently used may be a color ink having another color and may be a clear ink. In the case where the ink composition to be applied after the use of the second ink composition is a clear ink, the ink composition is not subsequently used in general.

In these conditions, a white-based colorant is preferably employed as the colorant contained in the first ink composition. In this embodiment, the ink ejected from the first head is uniformly applied to an appropriate range on the recording medium and can mainly serve as the background color of an image.

A white ink is accordingly used as an ink of the background color, thereby being able to further increase the quality of an image printed with a color ink, form an high quality image also on a transparent or semitransparent recording medium such as a soft packaging film, and form an image having desired quality regardless of the color of the recording medium.

The term "white-based" herein refers to a color that falls within a hue range in which a mark of a Lab system is placed on or inside a circumference having a radius of 20 on the a*b* plane and in which L* is not less than 70, in measurement with Spectrolino [name of a product commercially available from GretagMacbeth Corporation, under measurement conditions of D50, a viewing angle of 2°, and a white back (the color of paper that is put under a medium to be measured)]. Light gray, cream, or the like is accordingly included in addition to white.

In the white ink used in this embodiment, a white pigment can be used as the colorant.

Any white pigment that imparts the ink composition to a white color may be used, and a white pigment that has been traditionally used in this field can be used. Examples of such a white pigment include a white inorganic pigment, a white organic pigment, and a fine white hollow polymer particle. Examples of the white inorganic pigment include sulfate of alkaline earth metals, such as barium sulfate; carbonate of alkaline earth metals, such as calcium carbonate; silicas such as finely divided silicic acid and synthetic silicate; calcium silicate; alumina; hydrated alumina; titanium oxide; zinc oxide; talc; and clay. In particular, titanium oxide is known as a white pigment exhibiting preferable hiding power, colorability, and a dispersed particle diameter.

Examples of the white organic particle include organic compound salts disclosed in JP-A-11-129613 and alkylenebismelamine derivatives disclosed JP-A-11-140365 and JP-A-2001-234093. Examples of a specific product of the white organic pigment include ShigenoxOWP, ShigenoxOWPL, ShigenoxFWP, ShigenoxFWG, ShigenoxUL, and ShigenoxU (each being the name of a product commercially available from HAKKOL CHEMICAL CO., LTD.).

Examples of the fine white hollow polymer particle include a fine thermoplastic particle substantially made from an organic polymer, which are disclosed in U.S. Pat. No. 4,089,800.

In this embodiment, the above white pigments may be used alone or in combination of two or more.

Examples of the pigment used for the white ink include C.I. Pigment White 6, 18, and 21.

On the other hand, a colorant that can be dissolved or dispersed in a primary component of the photopolymerizable compound can be used as the colorant used for a color ink, and pigment is preferably employed in terms of weather resistance. The following types of the pigment can be used without limitation.

Examples of an inorganic pigment include carbon blacks such as furnace black, lamp black, acetylene black, and channel black; and ferrous oxide.

Examples of an organic pigment include azo pigments such as an insoluble azo pigment, a condensed azo pigment, azo lake, and a chelate azo pigment; polycyclic compounds such as a phthalocyanine pigment, perylene and perinone pigments, an anthraquinone pigment, a quinacridone pigment, a dioxane pigment, a thioindigo pigment, an isoindolinone pigment, and a quinophthalone pigment; dye chelate (for example, basic dye chelate, acid dye chelate, or the like); color lake (basic color lake or acid color lake); a nitro pigment; a nitroso pigment; aniline black; and a daylight fluorescent pigment.

Examples of a pigment used for a yellow ink include C.I. Pigment Yellow 2, 3, 12, 13, 14, 16, 17, 42, 73, 74, 75, 81, 83, 87, 93, 95, 97, 98, 109, 110, 114, 120, 128, 129, 138, 150, 151, 154, 155, 180, 185, and 213.

Examples of a pigment used for a magenta ink include C.I. Pigment Red 5, 7, 9, 12, 22, 38, 48(Ca), 48(Mn), 57(Ca), 57:1, 63:1, 101, 112, 122, 123, 144, 146, 168, 184, 185, 188, 202, and 209; and C.I. Pigment Violet 19.

Examples of a pigment used for a cyan ink include. C.I. Pigment Blue 1, 2, 3, 15:3, 15:4, 60, 16, and 22.

Examples of a pigment used for a black ink include C.I. Pigment Black 7.

Examples of other pigments include C.I Pigment Orange-16, 36, and 38 used for an orange ink; and C.I Pigment Green-7 and 36 used for a green ink.

The above pigments may be used alone or in combination of two or more.

In a preferable aspect of this embodiment, the pigment having an average particle size that is approximately in the range from 10 to 400 nm is preferably employed, more preferably approximately in the range from 50 to 350 nm.

The colorant is contained in the photocurable ink composition in an amount that is preferably approximately in the range from 0.1 to 25 weight %, more preferably approximately in the range from 0.5 to 15 weight %.

In particular, in the case where the colorant contained in the first ink is a white-based colorant made from the inorganic pigment, the white colorant is contained in an amount that is preferably in the range from 8 to 16 weight % with respect to the total weight (100 weight %) of the first ink composition, more preferably in the range from 9 to 14 weight %. In the case where the contained amount is 8 weight % or larger, a hiding power with respect to light is adequately increased in the first ink layer, and color development of the white ink as a background color can be therefore enhanced. On the other hand, in the case where the contained amount is 16 weight % or lower, the occurrence of defective ejection such as nozzle clogging and pigment deposition can be suppressed, and such a contained amount is therefore preferably employed.

In this case, the cure rate is changed mainly in proportion to factors such as the thickness of the ink layer, light transmittance in the ink layer, and the cure reactivity of the ink. In other words, as the thickness of the ink layer, the light transmittance in the ink layer, and the cure reactivity of the ink are each increased, the cure rate is also increased. Among these factors, the light transmittance in the ink layer is in reverse proportion to the hiding power with respect to light in the ink layer and to the color development of the ink.

In addition, the above pigment can be used so as to be dispersed in a medium with a dispersant or a surfactant. As a preferable dispersant, a product that will be hereinafter described can be used as well as a dispersant that has been traditionally used to prepare a pigment dispersion liquid, such as a polymer dispersant.

(4. Other Components)

The ink composition of this embodiment may contain components other than the above materials. The ink composition may contain, for example, a surfactant and a polymerization inhibitor.

Examples of the surfactant include a silicone surfactant such as polyester-modified silicone or a polyether-modified silicone. In particular, polyether-modified polydimethylsiloxane or polyester-modified polydimethylsiloxane is preferably employed. Specific examples thereof include BYK-347; BYK-348; and BYK-UV3500, 3510, 3530, and 3570 (each being the name of a product commercially available from BYK Japan KK).

Furthermore, the polymerization inhibitor may be added. The addition of the polymerization inhibitor serves to enhance the preservation stability of the ink composition. Examples of the polymerization inhibitor to be used include a hindered amine polymerization inhibitor such as IRGASTAB UV10 and UV22 (each being the name of a product commercially available from BASF Corporation).

In addition, a dispersant, polymerization promoter, slipping agent, penetration enhancer, wetting agent (humectant), and other additives may be contained. Examples of other additives include a fixing agent, antifungal agent, preservative, antioxidant, light-absorbing material, chelating agent, pH adjuster, and thickener.

[Recording Medium]

The recording medium is not specifically limited as long as a nonabsorbable recording medium is used, and examples of such a recording medium to be used include resin materials such as polyethylene terephthalate (PET), polypropylene, and polyethylene. In addition, the recording medium may have a treated layer (coating layer) that is formed on each of such materials. In the case where a white ink is used as the first ink, a transparent or semitransparent resin film or the like can be also used.

[Physical Properties of Ink Composition]

In view of ejecting ink by an ink jet technique, the ink preferably has a viscosity of 40 mPa·s or lower at a temperature of 25° C. The viscosity more preferably falls within a range of 32 mPa·s or lower. In the case where the viscosity exceeds a level of 40 mPa·s or lower, a dot that is ejected from an ink jet head to adhere to an adherend has a long and narrow tailed shape or flies with the result of being split into several pieces. Such a phenomenon may have disadvantageous effect on dot formation and may adversely affect image quality. Meanwhile, although the lower limit of the ink viscosity is not specifically limited, the ink preferably has a viscosity of 5 mPa·s or larger at a temperature of 25° C. in terms of practical application, more preferably 10 mPa·s or larger.

As described above, in embodiments of the invention, a recording method and recording apparatus can be provided, in which the occurrence of bleeding and repelling in a cured layer is suppressed; the excellent durability of an image is provided; the first ink layer (for example, the above white ink layer as a ground) is sufficiently cured; and the excellent adhesion of an ink is provided, during overprinting.

Embodiments of the invention are not limited to this embodiment. In a recording method of another embodiment of the invention, for example, only the above first process and second process may be conducted, or one or more processes may be employed after the fifth process, such one or more processes having the same procedure as conducted through the second, third, fourth, and fifth processes.

[Ink Set]

The ink set of an embodiment of the invention includes the first ink and the second ink (in addition, the third ink, fourth ink, and fifth ink) that are used in the recording method (or recording apparatus) of the above embodiment. Owing to the ink set, a record can be provided so as to particularly have excellent adhesion.

EXAMPLES

Although this embodiment will be hereinafter described in more detail with reference to examples and comparison examples, embodiments of the invention are not limited only to the examples.

[Material]

Materials were used in the examples and the comparison examples as follows.

[Pigment]

C.I. Pigment White 6 (commercially available from TOYO INK MFG. CO., LTD.)

C.I. Pigment Blue 15:4 (commercially available from TOYO INK MFG. CO., LTD.)

[Photopolymerization Initiator]

DUROCUR TPO (commercially available from BASF Corporation)

DETX-S (commercially available from Nippon Kayaku Co., Ltd.)

[Photopolymerizable Compound]

N-vinylcaprolactam (commercially available from BASF Corporation)

Tripropylene glycol diacrylate (commercially available from Shin Nakamura Chemical Co., Ltd.)

Trimethylolpropane triacrylate (commercially available from Shin Nakamura Chemical Co., Ltd.)

[Surfactant]

BYK UV3500 (commercially available from BYK Japan KK)

[Polymerization Inhibitor]

Irgastab UV10 (commercially available from BASF Corporation)

The following recording medium and recording apparatus were used.

[Recording Medium]

PET50A (a PET film commercially available from LINTEC Corporation)

[Recording Apparatus]

A recording apparatus having the same basic configuration as illustrated in FIG. 1 was used. The recording apparatus had the following characteristics. Two ink head units that were used were each an ink head unit that included a plurality of printer heads and that exhibited a nozzle resolution of 720 dpi. The recording medium was transported at a rate of 30 m per minute, and dots were recorded in the transport direction at a resolution of 720 dpi. The weight of an ejected ink was 18 ng. An LED having a peak wavelength of 395 nm was used as light sources for an ink of a background color and an image-forming ink. A mercury lamp with an output of 160 W/cm was used as a light source for the actual curing. The second ink was temporarily cured with energy of 10 mJ/cm$^2$. Energy for the actual curing was set to a level of 300 mJ/cm$^2$. The energy for temporarily curing the first ink was adjusted in each of the examples and comparison examples so as to indicate the cure rate of the first ink layer in each of the examples and comparison examples.

Examples 1 to 18 and Comparison Examples 1 to 12

Ink compositions A, B, C, D, E, F, and G were prepared so as to have composition listed in Table 1 (unit: weight %).

TABLE 1

|  | Ink A | Ink B | Ink C | Ink D | Ink E | Ink F | Ink G |
|---|---|---|---|---|---|---|---|
| N-vinylcaprolactam | 40 | 40 | 40 | 10 | 10 | — | — |
| Tripropylene glycol diacrylate | 41.7 | 48.7 | 41.7 | 71.7 | 78.7 | 71.7 | 78.7 |
| Trimethylolpropane triacrylate | — | — | — | — | — | 10 | 10 |
| DUROCUR TPO | 8 | 8 | 4 | 8 | 8 | 8 | 8 |
| DETX-S | — | — | 4 | — | — | — | — |
| BYK UV3500 | 0.1 | 0.1 | 0.1 | 0.1 | 0.1 | 0.1 | 0.1 |
| IRGASTAB UV10 | 0.2 | 0.2 | 0.2 | 0.2 | 0.2 | 0.2 | 0.2 |
| C.I. Pigment White 6 | 10 | — | 10 | 10 | — | 10 | — |
| C.I. Pigment Blue 15:4 | — | 3 | — | — | 3 | — | 3 |
| Total | 100 | 100 | 100 | 100 | 100 | 100 | 100 |

[Measurement Method]

[Evaluation 1: Bleeding]

In each of the combinations of the first ink and the second ink listed in Tables 2 to 7, the first ink (predetermined amount) was temporarily cured at a cure rate each listed in Tables 2 to 7 to form the first ink layer, and then a character was printed on the first ink layer in a size of 4 pt by using the second ink and was subsequently subjected to the actual curing. Then, the occurrence of the bleeding of the second ink was visually observed. The following evaluation criteria were employed. In addition, the evaluation results are listed in Tables 2 to 7.

A: The bleeding was not observed
B: The bleeding was observed

[Evaluation 2: Repelling]

In each of the combinations of the first ink and the second ink listed in Tables 2 to 7, the first ink (predetermined amount) was temporarily cured at a cure rate each listed in Tables 2 to 7 to form the first ink layer, and then solid printing was performed on the first ink layer by using the second ink. The actual curing was subsequently performed. Then, the occurrence of the repelling of the second ink was visually observed. The following evaluation criteria were employed. In addition, the evaluation results are listed in Tables 2 to 7.

A: The repelling did not occur, and successful solid printing was therefore observed
B: The repelling occurred, and unsuccessful solid printing was therefore observed

[Evaluation 3: Adhesion]

In each of the combinations of the first ink and the second ink listed in Tables 2 to 7, the first ink (predetermined amount) was temporarily cured at a cure rate each listed in Tables 2 to 7 to form the first ink layer, and then solid printing was performed on the first ink layer by using the second ink. The actual curing was subsequently performed. Then, a record (printed article) that had been produced as a result of completing the actual curing was cut with a knife in the manner of a grid (100 squares) such that the knife reached a surface of the recording medium. Adhesive cellophane tape was applied onto the grid and was then swiftly peeled off, and the results of the degree of peeling were evaluated on the basis of the following criteria. In addition, the evaluation results are listed in Tables 2 to 7. The results in which at least the level C was marked are considered to be available.

A: Peeling was not observed
B: Peeling of one square was observed
C: Peeling of two squares was observed
D: Peeling of three or more squares was observed

[Evaluation 4: Yellowing]

A character was printed on a recording medium (#125-E20, a PET film commercially available from Toray Industries, Inc.) by using each of the first inks (predetermined amount) listed in Tables 2 to 7, and the temporary curing was performed to form the first ink layer. Then, the color phase of the first ink layer was compared with the color phase of the recording medium, thereby obtaining color difference ΔE. The following evaluation criteria were employed. In addition, the evaluation results are listed in Tables 2 to 7.

A: ΔE<3
B: ΔE≥3

TABLE 2

|  | Comparison example 1 | Example 1 | Example 2 | Example 3 | Comparison example 2 |
|---|---|---|---|---|---|
| First ink | Ink A | Ink A | Ink A | Ink A | Ink A |
| Second ink | Ink B | Ink B | Ink B | Ink B | Ink B |
| Cure rate (%) of first ink layer immediately before ejection of second ink | 68 | 70 | 80 | 95 | 100 |

TABLE 2-continued

|  | Comparison example 1 | Example 1 | Example 2 | Example 3 | Comparison example 2 |
|---|---|---|---|---|---|
| Evaluation 1: bleeding | B | A | A | A | A |
| Evaluation 2: repelling | A | A | A | A | B |
| Evaluation 3: adhesion | A | A | A | A | D |
| Evaluation 4: yellowing | A | A | A | A | A |

TABLE 3

|  | Comparison example 3 | Example 4 | Example 5 | Example 6 | Comparison example 4 |
|---|---|---|---|---|---|
| First ink | Ink C | Ink C | Ink C | Ink C | Ink C |
| Second ink | Ink B | Ink B | Ink B | Ink B | Ink B |
| Cure rate (%) of first ink layer immediately before ejection of second ink | 68 | 70 | 80 | 95 | 100 |
| Evaluation 1: bleeding | B | A | A | A | A |
| Evaluation 2: repelling | A | A | A | A | B |
| Evaluation 3: adhesion | A | A | A | A | D |
| Evaluation 4: yellowing | A | A | A | B | B |

TABLE 4

|  | Comparison example 5 | Example 7 | Example 8 | Example 9 | Comparison example 6 |
|---|---|---|---|---|---|
| First ink | Ink A | Ink A | Ink A | Ink A | Ink A |
| Second ink | Ink G | Ink G | Ink G | Ink G | Ink G |
| Cure rate (%) of first ink layer immediately before ejection of second ink | 68 | 70 | 80 | 95 | 100 |
| Evaluation 1: bleeding | B | A | A | A | A |
| Evaluation 2: repelling | A | A | A | A | B |
| Evaluation 3: adhesion | A | A | B | B | D |
| Evaluation 4: yellowing | A | A | A | A | A |

TABLE 5

|  | Comparison example 7 | Example 10 | Example 11 | Example 12 | Comparison example 8 |
|---|---|---|---|---|---|
| First ink | Ink F | Ink F | Ink F | Ink F | Ink F |
| Second ink | Ink G | Ink G | Ink G | Ink G | Ink G |
| Cure rate (%) of first ink layer immediately before ejection of second ink | 68 | 70 | 80 | 95 | 100 |
| Evaluation 1: bleeding | B | A | A | A | A |
| Evaluation 2: repelling | A | A | A | A | B |
| Evaluation 3: adhesion | A | B | C | C | D |
| Evaluation 4: yellowing | A | A | A | A | A |

TABLE 6

|  | Comparison example 9 | Example 13 | Example 14 | Example 15 | Comparison example 10 |
|---|---|---|---|---|---|
| First ink | Ink D | Ink D | Ink D | Ink D | Ink D |
| Second ink | Ink E | Ink E | Ink E | Ink E | Ink E |
| Cure rate (%) of first ink layer immediately before ejection of second ink | 68 | 70 | 80 | 95 | 100 |
| Evaluation 1: bleeding | B | A | A | A | A |
| Evaluation 2: repelling | A | A | A | A | B |
| Evaluation 3: adhesion | A | A | A | A | D |
| Evaluation 4: yellowing | A | A | A | A | A |

TABLE 7

|  | Comparison example 11 | Example 16 | Example 17 | Example 18 | Comparison example 12 |
|---|---|---|---|---|---|
| First ink | Ink F | Ink F | Ink F | Ink F | Ink F |
| Second ink | Ink B | Ink B | Ink B | Ink B | Ink B |
| Cure rate (%) of first ink layer immediately before ejection of second ink | 68 | 70 | 80 | 95 | 100 |
| Evaluation 1: bleeding | B | A | A | A | A |
| Evaluation 2: repelling | A | A | A | A | B |
| Evaluation 3: adhesion | A | B | C | C | D |
| Evaluation 4: yellowing | A | A | A | A | A |

In Tables 2 to 7, the cure rates (%) of the first ink layers immediately before the ejection of the second inks were adjusted by the output of light sources for the first ink compositions.

As is obvious from Tables 2 to 7, the results provided the following finding: the layer formed as a result of curing the first ink at a cure rate that was in the range from 70 to 95% was overlaid with the second ink, thereby being able to suppress the occurrence of the bleeding and repelling in the cured layer and further enhancing adhesion between the ink layers. Such enhancement of the adhesion between the ink layers serves for providing the excellent durability of an image and sufficiently curing a white ink layer as a ground.

As is obvious from comparing the result in each of Tables 2 to 7 (especially, Table 3), it was confirmed that the degree of the yellowing of the white ink layer as a ground was changed depending on types of the photopolymerization initiator contained in the first ink composition. From the degree of the yellowing, it was found that DUROCUR TPO was a significantly excellent photopolymerization initiator. In addition, although not listed in the tables, it was found that the ink A required smaller irradiation energy for enabling the cure rate of the ink composition to fall within the range from 70 to 95% than the ink C. From this result, in terms of being able to reduce irradiation energy required for enabling the cure rate of the ink composition to fall within the range from 70 to 95%, it was found that the first ink composition advantageously contained an acylphosphine oxide-based polymerization initiator, such as DUROCUR TPO, as the photopolymerization initiator.

| [Reference Signs List] | |
|---|---|
| 1: | printer (line printer) |
| 23A: | upstream transport roller |
| 23B: | downstream transport roller |
| 24: | belt |
| 42a: | first light source (temporary curing emitter) |
| 42b: | second light source (temporary curing emitter) |
| 42c: | third light source (temporary curing emitter) |
| 42d: | fourth light source (temporary curing emitter) |
| 42e: | fifth light source (temporary curing emitter) |
| 44: | actual curing emitter |
| S: | recording medium |
| W: | first recording head (first head) |
| Bk: | second recording head (second head) |
| C: | third recording head (third head) |
| M: | fourth recording head (fourth head) |
| Y: | fifth recording head (fifth head) |
| CL: | clear ink recording head (clear ink head) |

The invention claimed is:

1. A recording method comprising:
  a first process which includes ejecting a first ink composition from a recording head onto a recording medium and which includes emitting light to the first ink composition that has adhered to the recording medium with the result that the first ink composition is cured at a cure rate that is in the range from 70 to 95%, the first ink composition containing a colorant, a photopolymerizable compound, and a photopolymerization initiator; and
  a second process which includes ejecting a second ink composition from a recording head to the first ink composition that has been cured on the recording medium and which includes emitting light from a light source to the second ink composition that has adhered to the cured first ink composition with the result that the second ink composition is cured, the second ink composition containing a colorant, a photopolymerizable compound, and a photopolymerization initiator.

2. The recording method according to claim 1, wherein the colorant contained in the first ink composition is a white-based colorant.

3. The recording method according to claim 2, wherein
  the white-based colorant is an inorganic pigment, and
  the white-based colorant is contained in an amount that is in the range from 8 to 16 weight % with respect to the total weight of the first ink composition.

4. The recording method according to claim 1, wherein each of the first ink composition and the second ink composition has a viscosity of 40 mPa·s or smaller at a temperature of 25° C.

5. The recording method according to claim 1, wherein the first ink composition and the second composition differ from each other in composition.

6. The recording method according to claim 1, wherein the first ink composition and the second ink composition contain N-vinylcaprolactam.

7. The recording method according to claim 1, wherein the first ink composition and the second ink composition each independently contain N-vinylcaprolactam in an amount that is in the range from 10 to 40 weight % with respect to the total weight of the ink composition.

8. The recording method according to claim 1, wherein the first ink composition contains an acylphosphine oxide-based polymerization initiator in an amount larger than or equal to 8 weight % with respect to the total weight of the first ink composition.

9. The recording method according to claim 1, wherein the first ink composition contains 2,4,6-trimethylbenzoyl-diphenyl-phosphine oxide in an amount larger than or equal to 8 weight % with respect to the total weight of the first ink composition.

10. An ink set at least comprising the first ink composition and second ink composition that are used in the recording method according to claim 1.

11. A recording apparatus comprising:
  a first ejecting section that ejects a first ink composition from a recording head onto a recording medium, the first ink composition containing a colorant, a photopolymerizable compound, and a photopolymerization initiator;
  a first light emitter that emits light from a light source to the first ink composition with the result that the first ink composition is cured at a cure rate that is in the range from 70 to 95%, the first ink composition having adhered onto the recording medium;
  a second ejecting section that ejects a second ink composition from a recording head to the first ink composition that has been cured on the recording medium, the second ink composition containing a colorant, a photopolymerizable compound, and a photopolymerization initiator; and
  a second light emitter that emits light from a light source to the second ink composition with the result that the second ink composition is cured, the second ink composition having adhered to the cured first ink composition.

* * * * *